United States Patent
Ross et al.

(10) Patent No.: US 8,145,911 B2
(45) Date of Patent: *Mar. 27, 2012

(54) SYSTEM AND METHOD FOR THE ELECTRONIC MANAGEMENT AND EXECUTION OF TRANSACTION DOCUMENTS

(75) Inventors: Darren G. Ross, Katy, TX (US); Charles E. Epperson, Pearland, TX (US)

(73) Assignee: Stewart Title Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/776,452

(22) Filed: May 10, 2010

(65) Prior Publication Data

US 2010/0217996 A1   Aug. 26, 2010

Related U.S. Application Data

(63) Continuation of application No. 11/256,482, filed on Oct. 21, 2005, now Pat. No. 7,734,925.

(51) Int. Cl.
    *H04L 9/32* (2006.01)

(52) U.S. Cl. ..................................................... 713/179
(58) Field of Classification Search ................... None
    See application file for complete search history.

(56) References Cited

U.S. PATENT DOCUMENTS

| 6,594,633 | B1 | 7/2003 | Broerman |
| 6,684,196 | B1 | 1/2004 | Mini et al. |
| 2001/0002485 | A1* | 5/2001 | Bisbee et al. ............... 713/167 |
| 2008/0028220 | A1 | 1/2008 | Wyssen |

* cited by examiner

*Primary Examiner* — Brandon Hoffman
(74) *Attorney, Agent, or Firm* — Baker Botts L.L.P.

(57) ABSTRACT

One aspect of the invention is a method for generating a certified electronic document that includes receiving identification information associated with a signatory user from a computer. From the same computer, identification information associated with a notary user is also received. At least one electronic document that requires certification is identified on a display. A first user command is received from the computer identifying the assent of the signatory user to the execution of the at least one electronic document. A second user command is received from the computer identifying the assent of the notary user to the certification of the at least one electronic document. Official indicia associated with the notary user is applied to the at least one electronic document to create at least one certified document.

38 Claims, 4 Drawing Sheets

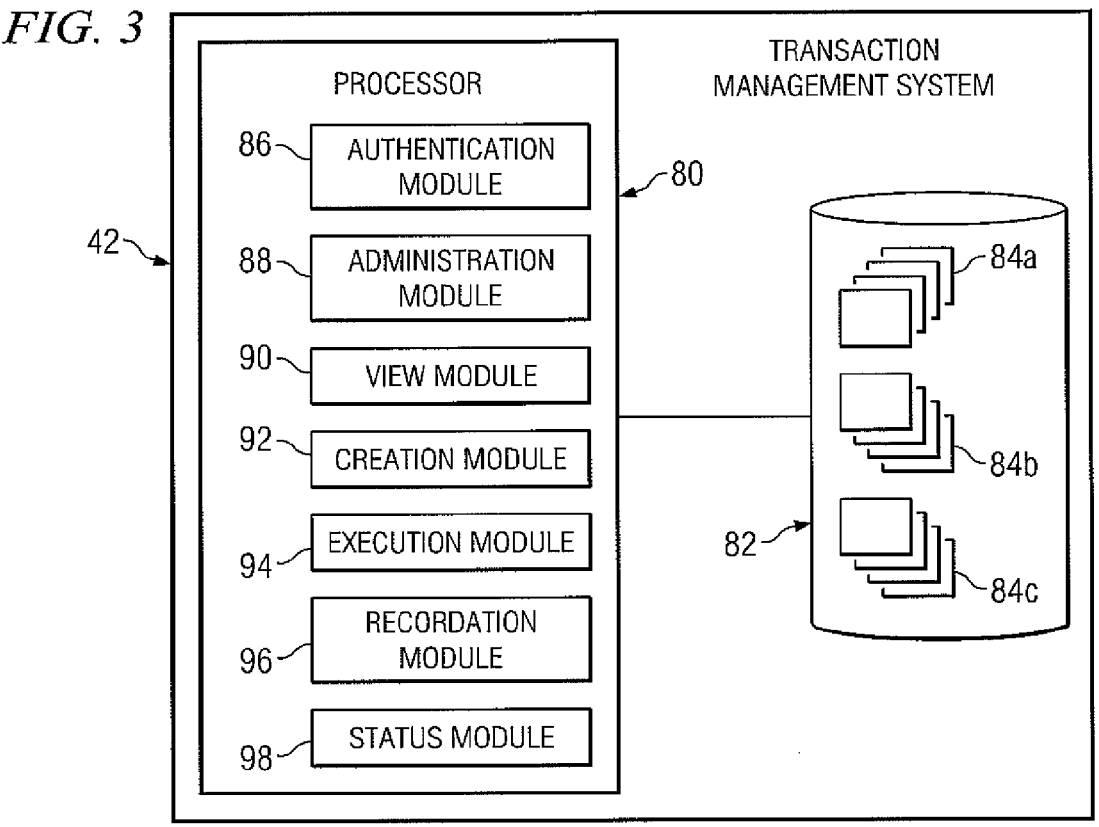
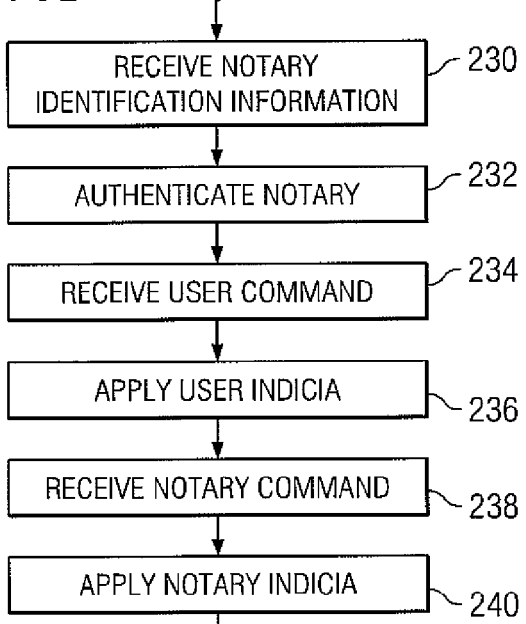

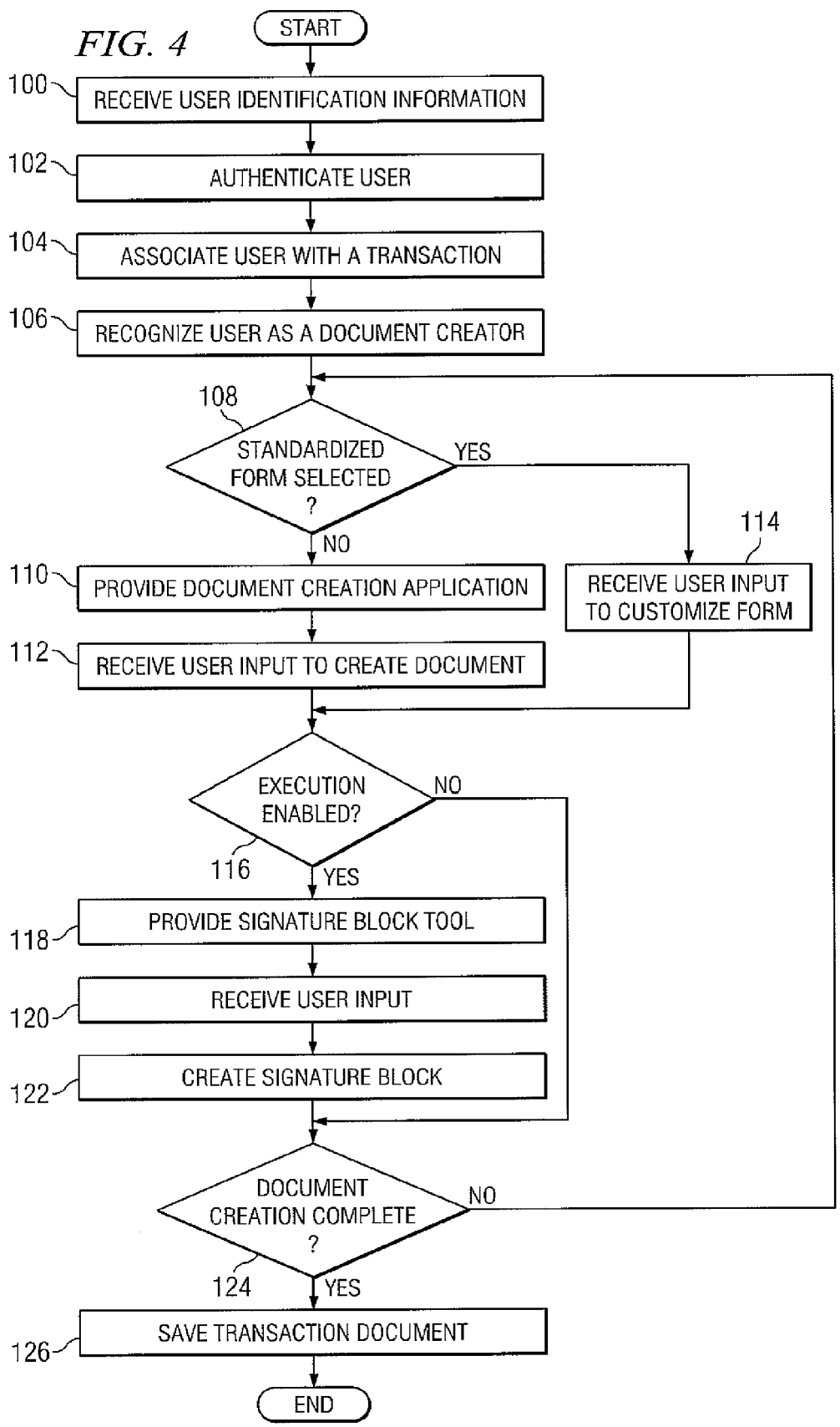

SYSTEM AND METHOD FOR THE ELECTRONIC MANAGEMENT AND EXECUTION OF TRANSACTION DOCUMENTS

RELATED APPLICATIONS

This application is a continuation of U.S. application Ser. No. 11/256,482, filed Oct. 21, 2005, issued Jun. 8, 2010 as U.S. Pat. No. 7,734,925 B2 entitled "System and Method for the Electronic Management and Execution of Transaction Documents."

TECHNICAL FIELD OF THE INVENTION

This invention relates generally to transaction management systems and more particularly to a system and method for the electronic management and execution of transaction documents.

BACKGROUND OF THE INVENTION

Financial transactions generally require the cooperative assistance of many individuals and entities. For example, a typical real estate transaction may involve a buyer, a seller, a realtor, a mortgagor, and a title company. For the purpose of completing the transaction, many of these or other individuals may produce transaction-related documents relevant to that individual's role in the transaction. In the case of a real estate transaction, for example, a realtor may generate a buyer-seller's contract, a mortgagor may generate mortgage documents, and title company may generate a Deed of Title. These documents are typically presented to the buyer and/or seller at a closing event. The buyer and seller must then go through each document and execute the documents in all the appropriate places. Because real estate and other financial transactions generally require that the parties sign multiple documents and often require the parties to sign a document multiple times, the closing event may be a time-consuming and generally inefficient process requiring the physical presence of many individuals related to the transaction.

For the purpose of familiarizing the parties with documents in advance of a closing event, the documents related to a transaction may be managed by a Transaction Management System (TMS). The TMS may maintain and store documents related to a transaction in a file that is associated with the particular transaction. Where the TMS is an Internet-based system, the TMS may make it possible for the parties and entities involved in the transaction to manage and view digital versions of the documents online. As a result, the parties and entities involved in a transaction may be granted protected access to transaction-related documents and may be permitted to share information with each other. For example, a buyer may log-on to the TMS to view a mortgage document. If the buyer identifies an error in the document, that error may be communicated to the mortgagor such that it may be fixed before the closing event. Although such systems may make the closing of the transaction a smoother event, closing events continue to be paper intensive. As a result, parties and entities involved in the transaction are required to be present at the closing event for the execution of printed copies of the transaction documents.

SUMMARY OF THE INVENTION

One aspect of the invention is a method for generating a certified electronic document that includes receiving identification information associated with a signatory user from a computer. From the same computer, identification information associated with a notary user is also received. At least one electronic document that requires certification is identified on a display. A first user command is received from the computer identifying the assent of the signatory user to the execution of the at least one electronic document. A second user command is received from the computer identifying the assent of the notary user to the certification of the at least one electronic document. Official indicia associated with the notary user is applied to the at least one electronic document to create at least one certified document.

The invention has several important technical advantages and/or features. Various embodiments of the invention may have none, one, some, or all of these advantages without departing from the scope of the invention. For example, in particular embodiments, an integrated system is provided that performs both document management and electronic execution functions. As a result, document preparers representing different entities with a role in the transaction may create transaction documents and enable those documents for electronic execution. The documents associated with the transaction may then be stored in a centralized location for access by signatories and other parties with an interest in the transaction. Furthermore, because the functions may be integrated into a single system that is web-based, consumer interfacing with the system may be performed from any remote location. As a result, signatories may review documents prior to a remote or physical closing event to familiarize themselves with the transaction documents. The signatories may then use the same system to execute the documents at a later date. In a similar manner, signatories may identify documents or portions of documents to which the signatory wishes a future-captured signature to be applied. As a result, the closing process may be made more efficient.

As an additional feature, the functionality provided by the system may be role-based or user-based such that individual users will receive customized views that include customized options that may be exercised based upon their identity or role with respect to the transaction. Thus, the system may differentiate between the views provided to a notary and the views provided to a buyer of a real estate property. For example, each party may only have access to documents for which they are responsible. Additionally or alternatively, each party may only be able to effect changes to documents to which they are responsible. As another example, the execution options provided to the parties may also vary depending upon the signing party's role with respect to the particular transaction. For example, although a buyer may be provided with a "click-to-sign" feature, a notary may be provided with a digital certificate retrieval feature. In this manner, the process may be customized on a per-user, per-role, per-document, or per-transaction basis. The customized features and processes may be expanded or diminished as desired based on manager preferences.

Still another feature may include the system's ability to allow for concurrent signing by multiple parties from a common location or from different remote locations. Where parties desire to be present at a common physical location or are required to be present at a common physical location, the web-based accessibility of documents maintained by a centralized system may allow multiple users to execute a document concurrently while in each other's presence or while at a common location. Conversely, where remote closing is desired, the parties may use network enabled computers to access a common document for concurrent execution from entirely different physical locations. Because the respective parties are only able to effect changes within user-specific portions of the document, the resolution of multiple changes to a document by multiple parties is minimized.

As still another example, a "click-to-sign" feature may enable signatories to sign only once and have an electronically captured signature applied as many times as required for the execution of a transaction document or a group of transaction documents. For example, a user may peruse through a transaction document at a closing ceremony or even at the user's leisure at some time prior to the closing ceremony. As the user is reviewing the document, the user may indicate his consent and intention to have a later-captured signature or other representative indicia associated with the user applied to one or more signature blocks within the document. Thus, where signing or initialing is required on each page of a document, the user may use a mouse or other input device to "click" on each or any signature or initial block(s) on each page of the document (or elsewhere) when review of the page is complete. Similarly, the user may use a mouse or other input device to "click" on a signature block at the end of the document (or elsewhere). A similar process may also be used for other documents that are also related to the transaction. As a result of this pre-closing process, the closing event may be greatly simplified. For example, whether the closing event is performed remotely or at an identified physical location, a signature capture device may be used to capture an electronic representation of the user's signature and/or initials. The signature or initials may then be automatically applied to each signature block and initial block, respectively, that was identified by the user during the "click-to-sign" process.

An additional feature that may be provided may include electronic notarization or certification of executed documents. Specifically, authentication procedures may be used to verify the presence of the notary at the execution of the document. Upon authentication, the notary may "click-to-sign" any appropriate transaction documents and may use a signature capture device to apply the notary's signature to the documents. Alternatively, a digital certificate retrieval tool may be used to generate or acquire a digital certificate associated with the notary. The digital certificate may be applied to documents to result in the certification of such documents in accordance with jurisdictional requirements. An additional advantage may be that the notary may choose to batch notarize multiple transaction documents with one click. Furthermore, in particular embodiments, features similar to these may be used to allow for the electronic witnessing of transaction documents.

BRIEF DESCRIPTION OF THE DRAWINGS

For a more complete understanding of the present invention and the advantages thereof, reference is now made to the following descriptions taken in conjunction with the accompanying drawings in which:

FIG. 3 illustrates a block diagram of an example system that may be used for the management and electronic execution of transaction documents in accordance with the present invention;

FIG. 4 illustrates a flow chart describing an example method for the electronic creation of transaction documents in accordance with the present invention; and FIGS. 5A and 5B illustrate flow charts describing an example method for the electronic execution and certification of transaction documents in accordance with the present invention.

DETAILED DESCRIPTION OF THE INVENTION

The preferred embodiment of the present invention and its advantages are best understood by referring to FIGS. 1-5 of the drawings, like numerals being used for like and corresponding parts of the various drawings.

Figure 1:
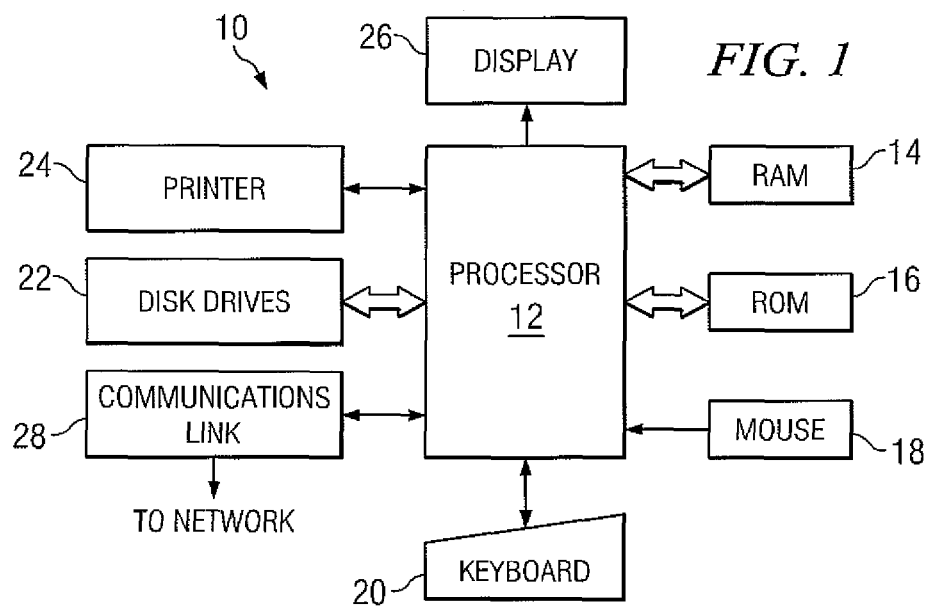
FIG. 1 illustrates a block diagram of a general purpose computer that may be used in accordance with the present invention.

FIG. 1 illustrates a general purpose computer 10 that may be used for the electronic management and execution of transaction documents in accordance with the present invention. In certain embodiments, general purpose computer 10 may be adapted to execute any of the well known MS-DOS, PC-DOS, OS2, UNIX, MAC-OS and Windows operating systems or other operating systems. As used in this document, operating system may refer to the local operating system for computer 10, a network operating system, or a combination of both.

General purpose computer 10 comprises processor 12, random access memory (RAM) 14, read only memory (ROM) 16, mouse 18, keyboard 20, and input/output devices such as printer 24, disk drives 22, display 26 and communications link 28. The present invention includes programs that may be stored in RAM 14, ROM 16, or disk drives 22 and may be executed by processor 12. Communications link 28 is connected to a computer network but could be connected to a telephone line, an antenna, a gateway, or any other type of communication link. Disk drives 22 may include a variety of types of storage media such as, for example, floppy disk drives, hard disk drives, CD ROM drives, or magnetic tape drives. Disk drives 22 may also include a network disk housed in a server within the enterprise network. Although this embodiment employs a plurality of disk drives 22, a single disk drive 22 could be used without departing from the scope of the invention. Furthermore, FIG. 1 provides merely one example of a computer that may be used with the invention. The invention could be used with computers other than general purpose computers as well as general purpose computers or other electronic devices without conventional operating systems. Examples of such devices include, but are not limited to, personal digital assistants, cell phones, kiosk terminals, and other network-enabled electronic devices.

Figure 2:
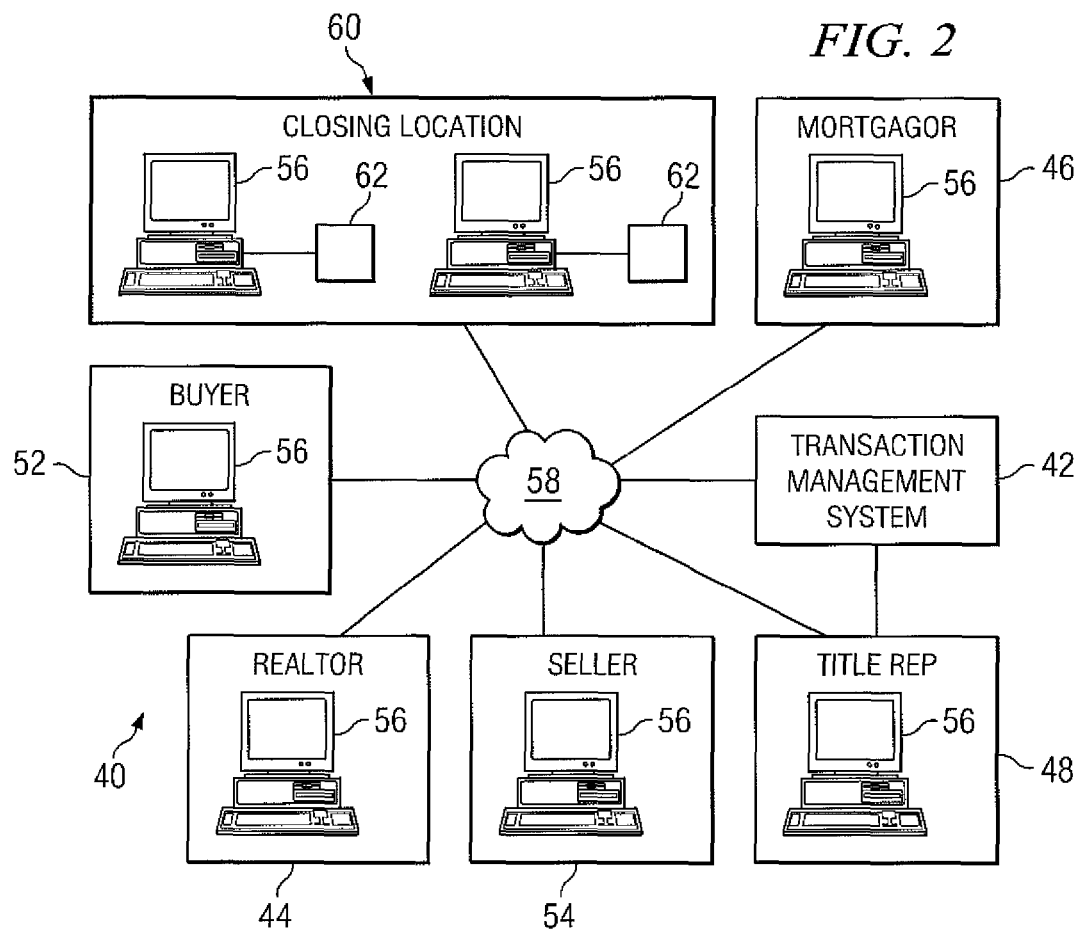
FIG. 2 illustrates a block diagram of an example system that may be used for the centralized management of and electronic execution of transaction documents in accordance with the present invention.

FIG. 2 illustrates an example transaction network 40 that includes a transaction management system (TMS) 42 that may allow for the centralized management of transaction documents in accordance with the present invention. As will be described in more detail below, TMS 42 may also allow for the electronic execution of transaction documents and, where appropriate, the electronic execution of certified documents. Transaction documents include any documents that are created for or otherwise identified as being associated with a transaction. The transaction may include any transaction documents whether related to business, personal, financial, or otherwise. For example, transaction documents may be described in this document as being related to a real estate transaction. Examples of such documents include, but are not limited to, title documents, buyer/seller contracts, mortgage documents, and any other document associated with a real estate transaction. Although the examples described herein illustrate how TMS 42 may provide improved closing experiences for those involved in a typical real estate transaction, it is generally recognized that TMS 42 may similarly operate to improve the efficiency of transactions outside the context of real estate. For example, TMS 42 might be used to manage business transactions.

In general, a real estate or other transaction may require multiple parties to prepare documents. For example, in a real estate context, a real estate agent may prepare a buyer/sellers contract, a deed of sale, and other transaction related documents. A mortgagor may prepare mortgage documents, and a title company may prepare a Deed of Title. For purposes of this patent, the parties who prepare transaction documents may be referred to as "document preparers." In the illustrated embodiment, transaction network 40 includes a realtor 44, a mortgagor 46, and a title company representative 48. Each of these parties and any other appropriate parties to the transaction may be document preparers and may prepare transaction documents that are relevant to their role in the transaction.

Many transactions typically require that multiple parties to the transaction review and execute a single transaction document. Depending upon the requirements of a particular document, the document may be designated for the signature of a single party, or the document may be designated for the signature of multiple parties. For purposes of this patent, the parties designated for reviewing and executing transaction documents may be referred to as "document executors," "executing parties," or "signatories." Continuing with the real estate example initiated above, a real estate transaction typically includes, as document executors, at least a buyer 52 and a seller 54. The buyer 52 and seller 54 may be required to sign common documents. Additionally, the buyer 52 or seller 54 may be solely responsible for the execution of other documents that are particular to their role in the transaction. For example, both buyer 52 and seller 54 may sign the contract of sale. However, only buyer 52 is typically required to sign the mortgage contract. Thus, not all transaction documents related to a single transaction are relevant to all parties involved in the transaction.

In some transactions, a document preparer may also be a document executor. It is generally recognized that mortgagor 46, realtor 44, title company representative 48, or any other party associated with a transaction may be responsible for both preparing transaction documents and executing transaction documents. For example, a mortgage document forms a binding contract between buyer 52 and mortgagor 46. Thus, although one role of the mortgagor 46 is to prepare a mortgage document for the transaction, another role of the mortgagor 46 may require the mortgagor 46 to sign the mortgage to bind buyer 52 to the obligations imposed by the document. This is merely one example, however, of the complex and overlapping roles of the parties involved in a transaction. Each party to a transaction may have multiple roles with respect to that transaction and each role may place different obligations on the party. Accordingly, although buyer 52 and seller 54 are described above as being document executors and mortgagor 46, realtor 44, and title representative 48 are described above as being document preparers, it is generally recognized that the roles and responsibilities of the parties may overlap and may be specific to a particular transaction and to a particular document.

As illustrated in FIG. 2, each party in transaction network 40 may have a computer 56. Computers 56 are in electronic communication with one another over a network 58. In particular embodiments, network 58 may include the Internet. Network 58 may include, however, a Land Area Network (LAN), a Wide Area Network (WAN), a Metropolitan Area Network (MAN), a Personal Area Network (PAN), an Intranet, an Extranet, or any combination of these or other suitable communication networks. In particular embodiments, computers 56 within transaction network 40 may be configured substantially like computer 10, which is described above with regard to FIG. 1. Alternatively, computers 56 may include any general purpose computer.

Computers 56 may include any appropriate application or applications that enable computers 56 to be used in the preparation of and/or execution of transaction documents. For example, the respective computers 56 may include word processing applications that allow realtor 44 to prepare a buyer/seller's contract, mortgagor 46 to prepare mortgage documents, and title representative 48 to prepare a Deed of Title. Similarly, computer 56 associated with buyer 52 may include applications that allow buyer 52 to review and, where applicable, execute transaction documents. For the centralized aggregation of prepared transaction documents, computers 56 may also include applications suitable for allowing document preparers to export or upload transaction documents to TMS 42 and document executors to download or view transaction documents that are managed by TMS 42. Other applications resident on or used by computers 56 may enable each computer 56 to communicate with other computers 56 within transaction network 40.

Transaction network 40 is illustrated as including multiple computers 56 at a closing location 60. Computers 56 at closing location 60 may include, among other software and/or hardware, applications for enabling the electronic execution of transaction documents by the signatories to the transaction. In particular embodiments, the closing location 60 may be a location that is neutral to buyer 52, seller 54, or other parties associated with the transaction. In particular embodiments, the parties may meet at or independently visit closing location 60 to electronically execute transaction documents and perform other duties associated with the closing of the deal. For example, in a real estate closing, buyer 52 and seller 54 may each visit a closing location 60 (same or different) for execution of transaction documents. Depending on how the transaction is set up, the buyer and seller may meet at closing location 60 and each use a computer 56 to concurrently perform execution duties in the presence of one another. Alternatively, the buyer 52 and seller 54 may perform their execution duties independently at different times or at different places within closing location 60 such that a meeting of the two signatories is avoided.

In an example scenario, buyer 52 and seller 54 may present themselves at closing location 60 at a specified time on a specified day. Buyer 52 and seller 54 may sit at two workstations that are each associated with a computer 56. Transaction documents that have been prepared for the parties' signatures may be displayed to the parties on displays associated with computers 56. The parties may then use computers 56 to electronically execute the transaction documents. The steps required to perform such an electronic execution may vary depending on state law. For example, where a state only requires that electronic documents be "clicked" or otherwise identified for execution, buyer 52 or seller 54 may merely be required to "click-to-sign" a transaction document to result in the binding execution of the document. In other states, a digital certificate might be used.

Conversely, where state law requires that an actual handwritten signature or other identifying mark be captured and associated with the transaction document before it may be considered executed, computer 56 at closing location 60 may include a signature capture device 62. Signature capture device 62 may comprise an electronic signature pad that is used to capture the handwritten signature of a signatory. Signature capture device 62 may operate similarly to signature pads located in retail stores. For example, the signature capture devices 62 may include a stylus that is used by the signatory to physically sign a window or other area of capture device 62 that is pressure-sensitive or that electronically captures stylus movements. The captured signature may be displayed to the signatory who, in particular embodiments, may be given the opportunity to accept or reject the captured signature. Examples of signature capture device may include USB, serial, or other attached liquid crystal displays or other displays such as those offered by Topaz Systems, Interlink Electronics, or others. Other examples of signature capture devices include TabletPC devices such as HP TC1100 offered by Hewlett Packard, the TravelMate C110 offered by Acer, Inc. and the Stylistic ST5021 offered by Fujitsu, Inc. Still other examples of signature capture devices include a mouse or other input device that includes a pointer that is used to "write" a user signature.

Although transaction network 40 is described as including a closing location 60, it is generally recognized that any computer 56 in transaction network 40 may be used for the closing. For example, the closing for many real estate transactions is hosted by the title company. In such a scenario, buyer 52 and seller 54 may each visit a designated title company location for execution of transaction documents. For example, buyer 52 and seller 54 may each use a computer 56 associated with title representative 48 to execute transaction documents and perform other closing duties. Because any computer 56 with network accessibility may be used by signatories to execute transaction documents, TMS 42 may enable remote closings that allow signatories to concurrently execute transaction documents from separate physical locations. In fact, even where jurisdictional requirements stipulate that an electronic representation of the signatories' signatures must be captured and affixed to the document to deem the document formally executed, any network-enabled computer 56 that includes signature capture device 62 may be used to perform execution duties. Furthermore, where remote closing is desired from a location that does not include a signature capture device 62, any of the parties to the transaction or any independent third-party may send a representative to the remote location with a signature capture device 62 that may then be used to capture an electronic representation of the document executor's signature.

As a further variation of transaction network 40, it is recognized that not all parties with a role in a transaction may have access to a computer 56. Accordingly, although each party illustrated in FIG. 2 includes a computer 56, this may not be the reality. For example, in some situations, a buyer 52 or seller 54 may not have a computer 56 from which they may access transaction network 40. Although such a buyer or seller may not realize many of the benefits described herein, the buyer or seller may still benefit from an improved closing experience where electronic execution of documents is enabled using a computer 56 associated with closing location 60.

As described above, TMS 42 may allow for the centralized aggregation and management of transaction documents. Specifically, TMS 42 may include a centralized database (or distributed database) for the storage of transaction documents prepared by any of the document preparers described above. In addition to transaction documents, TMS 42 may store other transaction related data such as task lists, process flows, instruction files, tutorials, or other transaction related information. Through network 58, any computer 56 in transaction network 40 may access data from or import data to TMS 42. Within TMS 42, data may be organized such that data common to a single transaction is stored in a common location (file or folder) or is otherwise identified as being associated with a common transaction. Accordingly, in some embodiments, TMS 42 may provide improved organization and accessibility of the complex information and multiplicity of documents associated with a transaction.

In particular embodiments, the documents associated with a transaction are available for perusal by the relevant parties even before the documents are to be executed. Thus, buyer 52 and seller 54 may review documents at their leisure before signature is required. Similarly, buyer 52 and seller 54 may provide feedback to document preparers where revision of the documents is necessary before signatures may be obtained. Additionally, TMS 42 may provide buyer 52 and seller 54 with a variety of real estate services relating to the various stages of the transaction. For example, buyer 52 may access information maintained by TMS 42 to determine the status of tasks to be completed by realtor 44, mortgagor 46, seller 54, title representative 48, and other parties having a role in the transaction.

Because TMS 42 offers improved processes for electronically executing documents, TMS 42 may improve the closing experience for buyer 52, seller 54, and other interested parties. As examples and as will be described in more detail below, TMS 42 may allow a single transaction document to be concurrently executed by multiple parties. Alternatively, TMS 42 may allow individuals to sign a single transaction document at different times. As such, the executing parties may not be required to gather at a common location for execution of transaction documents. Furthermore, in particular embodiments, TMS 42 may allow for the electronic execution of non-notarized and non-witnessed documents prior to a closing event. As a result the number of documents to be signed at the closing event may be reduced and the time spent at the closing event may be minimized.

In particular embodiments, TMS 42 may offer a "click-to-sign" process that allows a party to execute a document with little more than the click of a mouse. Where applicable state law allows, the "click-to-sign" command, when performed by the signing party, may by itself operate as the legally binding execution of the document. Thus, parties located at different locations may execute transaction documents at a "virtual closing" or "eclosing." In other embodiments, the "click-to-sign" feature may be used to identify a signatory's present intention to have a later captured signature applied to the transaction document at one or more locations within the document. For example, buyer 52 may use computer 56 to peruse through a mortgage contract that was prepared by mortgagor 46 and is maintained by TMS 42. This review of the mortgage contract may be performed at the buyer's leisure and at some time prior to the closing ceremony. As buyer 52 is reviewing the document, buyer 52 may indicate the buyer's consent to have his signature or other representative indicia applied to the many signature blocks within the document. Thus, after reviewing each page, buyer 52 may use a mouse or other input device to "click" on an initial block at the bottom of the page. Similarly, buyer 52 may use the mouse or other input device to "click" on a signature block at the end of the document. A similar process may be used for other documents related to the transaction as well. At a subsequent closing event or other use session, a signature capture device 62 may be used to capture an electronic representation of the buyer's signature. TMS 42 may then automatically apply the captured signature to the signature blocks previously identified by the buyer using the "click-to-sign" process. In some embodiments, a digital certificate may be associated with each block that was clicked. In some cases, one can simply click on the signature block to indicate assent. In other cases the signature block or a text box may prompt for assent.

In still other embodiments, where the buyer's computer (which could be any computer that a buyer chooses to use) includes a signature capture device, the "click-to-sign" feature and the signature capture device may be cooperatively used by the executing party to execute a transaction document from a remote location. For example, buyer 52 may use computer 56 to peruse through a mortgage contract that was prepared by mortgagor 46 and is maintained by TMS 42. As buyer 52 is reviewing the document, buyer 52 may indicate the buyer's consent to have his signature or other representative indicia applied to the many signature blocks (or initial blocks) within the document. Thus, after reviewing each page, buyer 52 may use a mouse or other input device to "click" on an initial block at the bottom of the page. Similarly, buyer 52 may use the mouse or other input device to "click" on a signature block at the end of the document. After the buyer's review is complete, a signature capture device at the remote location may be used to capture the buyer's signature. TMS 42 may then operate to apply, place, or otherwise associated the captured signature to the signature blocks previously identified by the buyer using the "click-to-sign" process.

As will be described in more detail below, an additional feature that may be provided by TMS 42 may include electronic notarization of document execution. Specifically, and using similar processes to those described above, TMS 42 may enable the electronic certification of transaction documents by a notary at a remote location. Because state laws generally require that the notary is present at the same location with the executing party, a notary may come to the location of the buyer and use computer 56 associated with buyer 52 to notarize the execution of a transaction document by buyer 52. Alternatively, where the buyer's signature is captured at a closing event such as at closing location 60, the notary may be present at the closing location 60 to electronically notarize the transaction document. As still another example, the buyer may visit a location associated with the notary for the performance of the execution process.

As will be described in more detail below, authentication procedures may be used by TMS 42 to verify the presence of the notary at the execution of the document and to identify the notary as a registered and/or valid notary. After successful authentication, the notary may "click-to-sign" any appropriate transaction documents and may use a signature capture device to apply the notary's signature to the documents. In other embodiments, a digital certificate may be applied rather than a signature. In particular embodiments, and as will be described in more detail below, TMS 42 may enable the notary to batch notarize multiple transaction documents with one click. Similar processes may be used to allow for the electronic witnessing of transaction documents.

FIG. 3 illustrates a block diagram of an example TMS 42 that may be used for the management and execution of transaction documents in accordance with the present invention. In the illustrated embodiment, TMS 42 includes a processor 80 and a database 82, which cooperate to perform the transaction management and execution functions described herein. Specifically, database 82 enables the centralized storage and organization of an aggregated compilation of transaction documents. Processor 80 may include a variety of modules for the authentication, administration, and execution functions provided by TMS 42.

Processor 80 is not intended to be limited, however, to the illustrated configuration. For example, although illustrated as including components that allow for both the centralized management of transaction documents and the performance of electronic execution of those documents. It is generally recognized that any of the features or services described below may be performed by a processor other than processor 80 and, in some embodiments, may be performed by a processor external to TMS 42. Additionally, electronic execution services and transaction management services may be provided by different service providers.

Organization of Transaction Documents

Transaction documents maintained by TMS 42 may be stored in a database 82 or another storage device internal to or otherwise accessible by TMS 42. In particular embodiments, the transaction documents may be organized into related groupings 84. For example, in particular embodiments, a grouping 84 may be include all documents and data related to a particular transaction. Thus, grouping 84a may relate to a first transaction, grouping 84b may relate to a second transaction, and so on. Continuing with the real estate example, each grouping 84 of transaction documents may include documents that are necessary to the closing of the real estate transaction. Thus, grouping 84a may include documents such as a buyer/sellers contract generated by realtor 44, mortgage documents generated by mortgagor 46, a Deed of Title generated by title representative 48, and any other documents generated by a party performing duties related to a particular real estate transaction.

Within each grouping 84, the transaction documents may be further divided into sub-groups. The sub-groups may be assigned based on party, creation date, deadline date, tasks to be performed, or other attributes that may be document-specific. For example, transaction documents may be separated into sub-groups based on which party prepared the document. As another example, transaction documents may be grouped together if the documents are to be signed by a common party. As will be described in more detail below, permissions to documents may be role-based or user-based. Accordingly, in particular embodiments, transaction documents associated with a common user may be grouped together such that when that user is granted access to data within TMS 42, the user may be given access to a virtual folder containing a particular grouping of transaction documents.

Additionally or alternatively, transaction documents may be grouped based on whether the transaction documents are execution enabled. For example, first grouping 84a may include informational documents that do not require any party's signature at a virtual or actual closing ceremony. Such documents may include, for example, a signed seller disclosure form or a property inspection report. By contrast, second grouping 84b may include documents that are enabled for electronic execution. As described above and as described in more detail below, such documents may include signature or initial blocks that require a signatory to perform specific steps to result in the electronic execution of the documents. Where the documents are organized based on whether the documents are execution enabled, it is recognized that, in particular embodiments, execution-enabled documents may be further divided into sub-groups based on whether execution is complete or incomplete, whether electronic notarization is required, whether third-party witnessing is required, whether execution will be performed now or later, whether execution will or must be performed by a particular date, whether specific tasks must be performed before the documents will be executed, whether special foreign related requirements must be met, whether the document is electronically recordable, who the signatories designated to the document are, or other execution-related attributes.

A myriad of modifications may be made to the above-described organization of transaction documents. For example, although specific combinations of attributes are described above for the efficient grouping and organization of transaction documents, any one of or combination of the above-described attributes may be used to group related transaction documents. Accordingly, it is not necessary that documents be organized in groups based on whether they are execution-enabled for the documents to be further organized based on whether execution is complete or not. Rather, documents may simply be classified as "complete" or "incomplete" and organized accordingly.

Furthermore, although TMS 42 is illustrated as including a single database 82, it is not necessary that all transaction documents maintained by TMS 42 be stored in a common database 82. Rather, different groupings 84 of documents may be stored in separate databases. For example, execution-enabled documents may be stored in a different database from non-execution-enabled documents. Similarly, notarization-required documents may be stored in a different database from documents that do not require notarization. Additionally or alternatively, execution-enabled documents may be exported to a different database for the execution process and then returned to database 82 when execution is complete. Multiple databases may be used with any combination of documents without departing from the scope of the invention.

Authentication of Transaction Parties

As described above, TMS 42 may use authentication procedures to verify a party's identity before access to certain data or features offered by TMS 42 is granted. Accordingly, in particular embodiments, processor 80 includes an authentication module 86 that provides authentication services. Authentication services may include the identification of users within transaction network 40 using methods that include, but are not limited to, login and password dialog, challenge and response, messaging support, and, depending on the security protocol utilized, encryption. Authentication enables a buyer 52, seller 54, or other party to a transaction to be identified before allowing access to data management services offered by TMS 42.

In an example scenario, buyer 52 may be required to register with TMS 42 before buyer 52 may be given access to data maintained by TMS 42. Alternatively, a manager or other party having administrative duties may register buyer 52 with TMS 42 to provide buyer 52 with access to TMS 42. In either situation, buyer 52 may be assigned a unique identifier that identifies buyer 52 as an authorized user of TMS 42. For example, buyer 52 may be assigned or may select a user name and a password. When buyer 52 desires to access transaction documents maintained by TMS 42 using computer 56, buyer 52 may use a web-browser to visit a URL providing TMS 42 services. When the URL is loaded, buyer 52 may be prompted to enter his user name and password before buyer 52 is allowed to review transaction documents, electronically execute transaction documents, or obtain other data managed by TMS 42. By allowing user access only after successful authentication, the security of transaction documents and other related data may be maintained.

User-Defined and Role-Defined Permissions

The user identification methods described above for authenticating a user to TMS 42 may also be used to perform authorization services. In particular embodiments, authorization services result in the assembly of a set of attributes that describe what actions the user is authorized to perform within TMS 42. Thus, the set of attributes associated with a user may define permissions that are granted to the user. For example, upon identification of a user to TMS 42, an administration module 88 may compare these attributes to information contained in database 82 or another database for the given user and the result may be used by administration module 88 to determine the user's actual capabilities and restrictions.

The permissions granted to a user may be set by a manager or other administrative user associated with TMS 42. Specifically, the manager may manipulate the settings associated with a user to associate specific permissions with the user's login id. As was described above with regard to FIG. 1, the manager or other administrative user may include a party with a stake in the transaction. In particular embodiments, the manager may include, for example, title company representative 48, mortgagor 46, or realtor 44. In other embodiments, the manager or administrative user may include an independent third party that is associated with an independently operated TMS 42.

The settings and attributes defined by the manager or other administrative user may be stored in database 82 or another database associated with or accessible by TMS 42. Administrative module 88 may then use the setting and attributes to determine a particular user's rights with respect to data maintained by TMS 42. For example, in particular embodiments, administrative module 88 may provide a user with selective access to transaction documents and other data stored in database 82. Specifically, the permissions associated with a buyer 52 may give buyer 52 a right to access a particular grouping 84 of transaction documents and other data stored in database 82. Alternatively, the permissions associated with the buyer 52 may grant access to the buyer on a per-document basis.

Permissions may also dictate what a user may do with the transaction documents or to which the user has access. For example, a manager may be granted "full control" status. "Full control" status may allow the manager to manipulate user settings, add or delete users that have access to TMS 42, organize transaction documents and data, and perform other administrative functions. Where TMS 42 is maintained by a party to the transaction, such as the title company, a manager, or other administrative user associated with the party may be given "full control" status for setting up the electronic closing system for a particular transaction.

As another example, a user may be granted "write" status. "Write" status may designate a user as a document preparer. For example, realtor 44, title company representative 48, and mortgagor 46 may each be given "write" status. As a result of this "write" status, the user may use TMS automated processes to generate transaction documents. In particular embodiments, the generation of such documents may include the population of fields within standardized forms. Information specific to the parties and transaction involved may be used to populate the standardized forms. The modified forms may then be associated with the specific transaction and stored in database 82 as transaction documents. Additionally or alternatively, a user with "write" status may generate transaction documents from scratch or obtain transaction documents from alternative sources. Independently created or obtained transaction documents may then be uploaded to TMS 42, associated with a particular transaction, and stored in database 82.

As still another example, a user may be granted "read" or "read and execute" status. Whereas "read" status may allow a user to merely review a transaction document, "read and execute" status may additionally allow a user to electronically execute a transaction document. For example, buyer 52 may have "read" status with respect to a Deed of Title. Seller 54, on the other hand, may have "read and execute" status with respect to the same document since the seller's signature is required on the document for it to become legally enforceable. With respect to a buyer/seller's contract, however, both buyer 52 and seller 54 may be given "read and execute" status since each is required to execute the document.

In the examples described above, permissions are granted on a document-by-document basis. Permissions may also be granted, however, on a group basis. Thus, an administrator may use administration module 88 to generate a set of attributes for a user that include permissions to transaction documents based on the classification of the documents into one or more groupings 84. For example, the administrator may give a buyer 52 "read status" with respect to a first grouping 84a of transaction documents and "read and execute" status with respect a second grouping 84b of transaction documents. In this manner, permissions to transaction documents and data may be linked to the organizational configuration of the documents and data within database 82.

In still other embodiments, permissions may be granted on a role-basis. Thus, an administrator may use administration module 88 to assign a user to one or more standardized roles. The actions that a user is allowed to take with respect to a document may be defined by standardized attributes that are assigned to the role that the user fulfills with respect to the transaction. For example, buyer 52 as the purchaser of the property at stake in a real estate transaction may be designated to the "buyer" role. When buyer 52 logs in to TMS 42, administration module 88 may reference data in database 82 or another database to identify the permissions generally granted to a user fulfilling the role of "buyer." Administration module 88 may then grant buyer 52 selective access to only those documents that are identified as buyer-accessible by the permissions associated with the "buyer" role. By contrast, title company representative 48 may be identified at login as a document preparer and given permissions that allow title company representative 48 to create documents for review and execution by other parties to the transaction.

User-Defined and Role-Defined Views

Similar to the permissions granted above, the views displayed to the variety of users accessing data maintained by TMS may vary. In particular embodiments, the views may vary on a user-by-user basis. For example, where permissions are granted to users on a user-by-user basis, a view module 90 may access the attributes or settings in database 82 that are associated with a user to determine the appropriate view to display to that user. As a result, the graphical user interface (GUI) screens displayed to buyer 52 may be very different from the GUI screens displayed to mortgagor 46. For example, the GUI displayed to buyer 52 may include a listing of transaction documents to which buyer 52 is determined to have access. The GUI, however, may provide buyer 52 with limited options with respect to the listing of transaction documents. As a result, buyer 52 may be given read-only access to some transaction documents and have the additional option to electronically execute some other transaction documents. Conversely, the GUI displayed to mortgagor 46, while including some of the same transaction documents as those listed for buyer 52, may provide mortgagor 46 with more administrative options with respect to documents for which mortgagor 46 is responsible. Similarly, where TMS 42 is maintained by title company representative 48, the view displayed to title company representative 48 may include many more administrative features and options than the displays presented to buyer 52 or mortgagor 46.

In other embodiments, the views displayed to a user may be determined on a role-by-role basis. As described above, an administrator may use administration module 88 to assign a user to one or more standardized or customizable roles. When the user logs into TMS 42, view module 90 may then use these roles to generate a view that is specific to the user's role with respect to a transaction. For example, when a buyer 52 logs in and is identified as being assigned a "buyer" role with respect to an identified transaction, view module 90 may reference data in database 82 or another database to identify attributes that are applied to a user fulfilling the role of "buyer." View module 90 may then cause buyer-specific GUIs to be displayed to buyer 52. As described above the views provided to buyer 52 may be different from and include different options than the views provided to title company representative 48, mortgagor 46, realtor 44, or any other party associated with the transaction.

The view provided to a specific user of TMS 42 may be determined based on the permissions maintained by administration module 88. Accordingly, where permissions identify only a specific subset or grouping 84 of transaction documents to which a user has access, the view provided to that user may include only a listing of this subset or grouping 84 of transaction documents. Documents to which the user does not have access may not be displayed to the user or otherwise identified to the user as being related to the transaction.

Transaction Document Creation Services

As described above, processor 80 may enable the creation of transaction documents. Accordingly, processor 80 includes a creation module 92. In particular embodiments, creation module 92 may include user-selectable forms that may be populated to create documents that are particular to a specific transaction. For example, creation module 92 may use a generic, standardized Deed of Title form, which is then populated with buyer and seller information, title company information, property information, and other relevant data to create a Deed of Title that is particular to the specific transaction. In other embodiments, creation module 92 may include word processing tools or other computerized applications that may be used to create transaction documents. In still other embodiments, creation module 92 may include applications that enable creation module 92 to receive transaction documents that are created independently of TMS 42.

For the creation of executable documents, creation module 92 may also include a signature placement tool that may be used by a document creator or a manager to create one or more electronically executable signature blocks associated with a transaction document. As an initial step, the user may use a mouse or other input device to identify the location within a transaction document for the placement of a signature block. The user may also use the mouse or other input device to identify the type of signature block to be injected into the transaction document. The signature placement tool of creation module 92 may then cause a signature block to be created and placed at the identified location within the transaction document. Where allowed by the signature placement tool, the signature block may then be deleted, modified, or relocated within the document as a user desires. In preferred embodiments, creation module 92 places no limitation on the number of signature blocks and initial blocks that may be placed within a document. Thus, a single document may include many signature and/or initial blocks.

In particular embodiments, the signature placement tool of creation module 92 may include a drop down menu that allows a user to identify the party to whom the signature block is assigned. For example, if mortgagor 46 uses creation module 92 to generate a mortgage contract for buyer 52, signature creation tool may allow mortgagor 46 to use a mouse or other input device associated with computer 56 to identify a location for the creation of a signature block in the mortgage contract. Where multiple signatures or initials are required, the signature creation tool may allow mortgagor 46 to create multiple signature blocks in the mortgage contract. With respect to each signature block, mortgagor 46 may then assign or designate a signatory as being responsible for executing the signature block. For example, a drop down menu or right-click menu may be used to allow mortgagor 46, as the document creator, to select buyer 52 from a list of parties that may be associated with the transaction.

In other embodiments, creation module 92 may include SMART signature mapping tools that result in the automatic generation of signature blocks within a transaction document. For example, where a form is used to create a transaction document, SMART signature mapping tools may automatically place signature blocks at predefined locations within the transaction document. The document creator or a manager of TMS 42 may then go through the document and, for each signature box, designate a party as being responsible for executing that signature box. Alternatively, the SMART signature mapping tools may allow for role-based assignment or designation of signature boxes. For example, a manager or other administrative user of TMS 42 may designate buyer 52 as fulfilling the "buyer" role with respect to a particular real estate transaction. The SMART signature mapping tools may then automatically designate buyer 52 as the party responsible for executing a signature box based on the buyer's role as "buyer."

Additionally, the type of signature box placed in the document may be automatically selected by creation module 92 based on the signatory to whom the signature box is designated. Because the creation and designation of signature blocks may be automated and because the document is customized to the signatory, in the described embodiment, creation module 92 may be said to generate a SMART document. The document preparer or the manager may then have the opportunity or ability to accept or reject the automatic placements and user-designations of the signature boxes within the smart transaction document. The document preparer and/or manager may also have the ability to clear all automatically placed signature boxes or to clear all automatic signatory designations in favor of manual placement and designation of signature boxes.

Electronic Execution Services

In certain embodiments, it is anticipated that the mere creation of and user designation of a signature block may be all that is required to enable a transaction document for electronic execution. In other embodiments, however, an additional step may be required to enable a transaction document stored in database 82 for electronic execution. Where additional user interaction is required, the document creator or a manager may use execution module 94 to enable a document for electronic execution. For example, when logged into the TMS 42, a document creator may see a listing of documents for which the document creator is responsible. The document creator may select any document from the listing and may be presented with one or more options with regard to that document. In particular embodiments, an option provided to the document creator may allow the document creator to designate the transaction document as execution enabled.

Once enabled for electronic execution, execution module 94 may provide execution services that allow designated parties to electronically execute the transaction document. When logged into TMS 42, parties assigned to one or more signature blocks within a transaction document may be given an option of electronically executing the transaction document. In particular embodiments, execution services provided to such signers may include "click-to-sign" services. As described above with regard to FIG. 1, "click-to-sign" services allow an executing party to review a document and click or select signature blocks to identify that party's intention to be bound to the document. As also described above, the steps required to perform electronic execution of a transaction document may vary depending on state law. For example, where a state only requires that electronic documents be "clicked" or otherwise identified for execution, the selection of a document or of a signature block may be all that is required to deem a document a legally binding and executed transaction document.

Where state law requires that an actual handwritten signature or other identifying mark be captured and associated with the transaction document before it may be considered executed, however, services provided by execution module 94 may include the ability to apply a signature captured at a later date to a transaction document that was executed using the "click-to-sign" process at an earlier time. Accordingly, execution module 94 may include an application appropriate for capturing and/or receiving an electronic representation of a signature and for applying that signature to transaction documents. Thus, execution module 94 may communicate with a signature capture device 62 to receive an electronic representation of an executing party's signature.

Similar to previously described features of TMS 42, the execution services provided by execution module 94 may vary on a user-by-user or role-by-role basis. For example, some users such as buyer 52 or seller 54 may be provided with the above-described "click-to-sign" service. Although such a service may also be provided to a notary where such a process is all that is required by state law to result in a legally enforceable and certified document, other execution services may be offered to a notary where state law requires additional certification measures or where it is desirable to provide a notary with execution options.

For example, execution module 94 may recognize or offer notary execution services that enable the application of notarization indicia to a transaction document. Where state law requires or where it is the preference of the parties to the transaction, the notarization indicia may comprise a digital certificate. The digital certificate may be one that is generated by a digital certificate authority such as VeriSign, Inc. Alternatively, where state law does not stipulate the brand of digital certificate required and/or where the parties have no preference, any other electronic certification tool may be used to create a certified document. For example, TMS 42 may offer notarization services that utilize RSA technology to produce a digital certificate.

In particular embodiments, the digital certificate adds an additional layer of security to the transaction document. For example, where a digital certificate consists of a public key used to encrypt information and a private key used to decipher it, the certification of a notarized document is not easily replicable. Furthermore, a digital certificate that includes tamper sealing features may provide verification that the transaction document has not been altered since it was digitally notarized and/or executed.

Another execution service provided to notaries may include the ability to certify a batch of documents at one time. For example, where one or more of the documents require notarization, a notary present with the buyer at the closing event may login to TMS 42 (on the same computer as buyer) and be given an option to batch notarize the transaction documents for which the buyer's signature was obtained. The digital certificate or other certifying indicia associated with the notary may then be applied to all executed documents that require notarization. In particular embodiments, similar functionality may be provided for other parties to a transaction as well. For example, a document executor, such as buyer 52, may "click-to-sign" multiple transaction documents prior to the transaction closing event. At the closing event the buyer 52 may then select multiple documents from a listing of transaction documents that the buyer 52 wishes to batch sign. The buyer 52 may then "click" or select a "batch sign now" option, or where state law requires, use a signature capture device 62 to apply an electronic representation of the buyer's signature to the batch of transaction documents.

An additional feature that may be provided by execution module 94 may include concurrent execution by multiple parties. In particular embodiments, multiple users may access TMS 42 at a given time. Because a user is only given access to execute signature blocks that are designated for that user, the user may execute a transaction document at the same time as other users, and only the signature blocks designated to the particular user are changed. Such execution services allow users to execute transaction documents remotely at a virtual closing event. Any computer with access to TMS 42 through network 58 may be used by a party to perform execution duties. However, such services also allow users at a common physical location, such as closing location 60 to use multiple work stations to concurrently execute transaction documents. In either scenario, because the closing process allows for multiple parties to sign transaction documents at the same time, the time expended at a closing event, whether remote or at a closing location, is reduced. Furthermore, TMS 42 applies no restriction on the number of parties that may concurrently execute a transaction document at any one time.

Electronic Recordation

Processor 80 may also include a recordation module 96 that operates to export executed documents for recordation when appropriate. For example, in the real estate context, documents generally requiring recordation include executed land titles. Accordingly, recordation module 96 may export an executed land title directly to a recording authority, such as a government property recordation office. Alternatively, recordation module 96 may export the executed land title to a third-party service provider who may then assume responsibility for procuring the recordation of the document.

In particular embodiments, the exportation of a transaction document may be scripted such that it occurs immediately after execution of the transaction document is deemed complete. In other embodiments, the manager of TMS 42, the document creator, or another user responsible for the document may request that the transaction document be exported to the recordation authority. The exported transaction document may include an image file such as a .TIFF that includes an image of the executed document. The image file may also be accompanied by an XML file of the transaction document. After exportation, the XML file may be electronically stamped with a recordation date by the recordation authority. A copy of the stamped XML file and image file may be stored in a recordation database. The stamped XML file and image may then be transmitted back to recordation module 96 or another component of TMS 42, which may update the status of the document as properly recorded. The provision of XML and image files to the recordation office, where available, reduces the recordation of defective titles since errors resulting from scanning or the keying in of information are avoided.

Document Status Updates

In the illustrated embodiment, processor 80 includes a status module 98 that operates to maintain at least one status identifier for each document maintained by TMS 42. When a user logs in to TMS 42 to view transaction documents or obtain other transaction-related data, a listing of documents to which that user has access may be displayed. In particular embodiments, one or more status identifiers may be associated with each document. As examples, identifiers may be used to indicated that a document has any of the following attributes:

execution enabled
execution incomplete
execution in progress
execution complete
recordation required
recordation complete
notarization required
final draft
working draft
review required
approval required Thus, users of TMS 42 may check the status of a document at any time to determine whether action by the user is required. Buyer 52, for example, may check to see if a document prepared by mortgagor 46 is ready for execution. Users of TMS 42 may also check the status of a document to determine whether other users have performed necessary tasks. Thus, mortgagor 46 may check to see if a mortgage document has been reviewed or signed by buyer 52.

The updating of the status of a document may be performed automatically by status module 98 when an action by a user is detected by status module 98. Thus, if a document requires review and approval by buyer 52 before the document may be execution-enabled, status module 98 may detect when these tasks have been performed by buyer 52 and automatically update the status identifiers associated with the document to indicate that the buyer has reviewed and approved the document. A new status identifier may be associated with the document to indicate that it is now enabled for electronic execution. Additionally or alternatively, users of TMS 42 may manually update the status of documents upon the performance of tasks. For example, after reviewing a document, buyer 52 may be asked whether the buyer wishes to change the status of the document from requiring review to review complete. When status module 98 receives an indication from buyer 52 that such a status change is desired, status module 98 may remove one or more identifiers associated with the document and/or associate additional identifiers to indicate the updated status of the document.

Execution Opt Out

In some circumstances, a user may desire to opt out of electronic execution in favor of a more conventional closing process. Such an election may occur at any time before execution of the documents is deemed complete. For example, buyer 52 may "click-to-sign" one or more transaction documents in a jurisdiction that requires the additional step of capturing an electronic representation of the buyer's signature. If buyer 52 determines that he prefers a conventional paper closing rather than the electronic closing provided by TMS 42, buyer 52 may opt out. As a result, any "click-to-sign" designations may be discarded. In such circumstances, buyer 52 would then be required to manually go through the transaction documents and sign all appropriate places. Conversely, where buyer 52 has use the "click-to-sign" feature in a jurisdiction that recognizes the feature as a valid and legally enforceable execution, buyer 52 may be precluded by jurisdictional requirements from opting out or canceling the previously electronically executed transaction documents.

Where a buyer 52 desires to use a more conventional paper closing process, the services provided by TMS 42 may be similar to the services provided by transaction management systems that do not include electronic execution services. Thus, the modules of processor 80, as described above, may continue to be utilized for the preparation of and management of transaction documents. Because documents may be prepared using TMS 42 for execution and centrally maintained, however, TMS 42 may continue to simplify the closing process and improve customer satisfaction throughout the entire transaction.

Additional Administrative Features

Additional administrative features may be offered by administration module 88 or another appropriate module of processor 80. One such feature may allow a manager or other administrative user to organize the documents in ways that improve the efficiency of the closing process. For example, administrative module 88 may display options to the manager that allow the manager to arrange the documents in a desired order or sequence. The order may vary depending upon whether the transaction documents are in a review state or an execution state. Another feature may allow a manager or other administrative user to add or delete documents even where the manager is not a document creator with respect to the transaction documents. Thus, the manager may be given overriding authority with respect to the management of transaction documents.

Another feature offered by TMS 42 may allow a user to hide a transaction document from the view of other users until that document is determined to be complete or otherwise releasable. Such a feature may be offered to a manager, a document creator, or another user responsible for a transaction document. When the document is determined to be complete or in a reviewable draft form by the appropriate party, the user may use administrative module 88 to release the transaction document so that other users may view it. Additionally or alternatively, the user may be given the ability to select users who should be given access to the document at any given time.

Another similar feature may allow a user to activate a group of documents for execution. This feature may be in addition to other features described above that allow transaction documents to be enabled for electronic execution. For example, mortgagor 46 may prepare a mortgage document for signature by buyer 52. During the preparation of this document, mortgagor 46 may insert one or more signature boxes and designate those signature boxes for signature by buyer 52. The mortgage document may then be saved in a grouping 84*a* of other execution enabled documents in database 82. At some time in the future, such as at the initiation of a closing event, a manager or other user may activate all documents in grouping 94*a* for electronic execution. In this manner, buyer 52 may be prevented from electronically signing the transaction document before a desired time. In a similar manner, a manager or other user may also be allowed to deactivate a grouping 84*a* of transaction documents so that one or more documents may be revised, deleted, or added within the grouping 84*a*.

Although TMS 42 is described above as including specific components and modules for performance of document management and execution operations, it is recognized that TMS 42 may have more or fewer components of these or differing types without departing from the scope of the invention. Additionally, while the various modules of processor 80 are illustrated and described as separate components, some or all of the functions described as being performed by these modules may be combined. For example, the functionality for providing the document management and document execution features described above may reside in any one or combination of the illustrated components.

FIG. 4 illustrates a flow chart describing an example method for the electronic creation of transaction documents in accordance with the present invention. The method begins at step 100 when user identification information is received. As described above, the identification information may include, in particular embodiments, a user name and password that is unique to a registered user of TMS 42. The identification information may be used by TMS 42 to authenticate or verify the identity of the user to TMS 42 at step 102.

At step 104, the user may be associated with a transaction. For example, where the user comprises mortgagor 46, TMS 42 may identify mortgagor 46 as a mortgage provider with respect to one or more transactions managed by TMS 42. Based on the role of user to the one or more transactions or based on the identity of user generally, the user may be recognized as a document creator at step 106. Upon recognition of the user as a document creator, various document creation options may be offered to the user. One such option may include the provision of one or more standardized forms that are available to the user. Another option may include the ability to download documents created using applications external to TMS 42. Still another option may include the provision of a document creation application that enables the user to create a transaction document from scratch.

At step 108, a determination is made as to whether a standardized form has been selected by the user. Where a standardized form has not been selected or offered to the user, a document creation application may be provided to the user at step 110. Such a tool may include, for example, an enhanced word processing application. In the above described example, where the user is identified as mortgagor 46, mortgagor 46 may select to create a transaction document from a standardized form mortgage contract. User input may then be received from the mortgagor 46 at step 112 and a transaction document may be created.

Conversely, where it is determined at step 108 that a standardized form has been selected, user input may be received to customize the standardized form at step 114. The user input received may depend upon the application utilized by TMS 42 for the creation of the transaction document from the standardized form. In one example embodiment, the form may be displayed to the user. Fields within the standardized form may be identified to the user and the user input may include information appropriate to populate these fields. In another example embodiment, a script may be used to pose questions to the user and the user input may comprise answers to these questions. The answers may then be used to populate the fields of the form.

Whether the document is created from a standardized form or from scratch, a determination may be made at step 116 as to whether the document is to be enabled for electronic execution. The determination may be made based on user input. For example, the user may be prompted to identify whether the document is to be enabled for electronic execution. If the user indicates that such a feature is desired, a signature tool may be provided at step 118 for the creation of signature blocks. The signature tool may operate as described above with respect to FIG. 3. Thus, in particular embodiments, the signature tool may operate to insert and/or designate signature blocks based on user input received at step 120. In other embodiments, the signature block tool may operate to automatically insert and/or designate signature blocks based on user-based or role-based definitions. The signature blocks may be inserted into the document at step 122.

Where it is determined that the document is not to be enabled for electronic execution at step 116, steps 118-122 may be omitted. Instead, the method may proceed directly to step 124 where a determination is made as to whether the creation of the document is complete. Where creation is not complete the method may return to step 108. Based on whether the document is being created from a standardized form or from another creation application, the method may then cycle through steps 108-124 as is appropriate until the creation of the document is determined to be complete. These additional steps may be used to insert additional text into the document, to populate additional fields within a standardized form, or to insert additional signature blocks where desired. When the creation is determined to be complete at step 124, the document may be saved in a centralized database at step 126. The document may be associated with a particular transaction, user, or group of users and selective access to the document may be provided in the manner described above with regard to FIG. 3.

Modifications, additions, or omissions may be made to the method illustrated in FIG. 4 without departing from the scope of the invention. The method may include more, fewer, or other steps. Additionally, the steps may be performed in any suitable order without departing from the scope of the invention. The illustrated and described method is merely one example of a method that may be used by TMS 42 to provide for the creation of a transaction document.

Figure 5A:
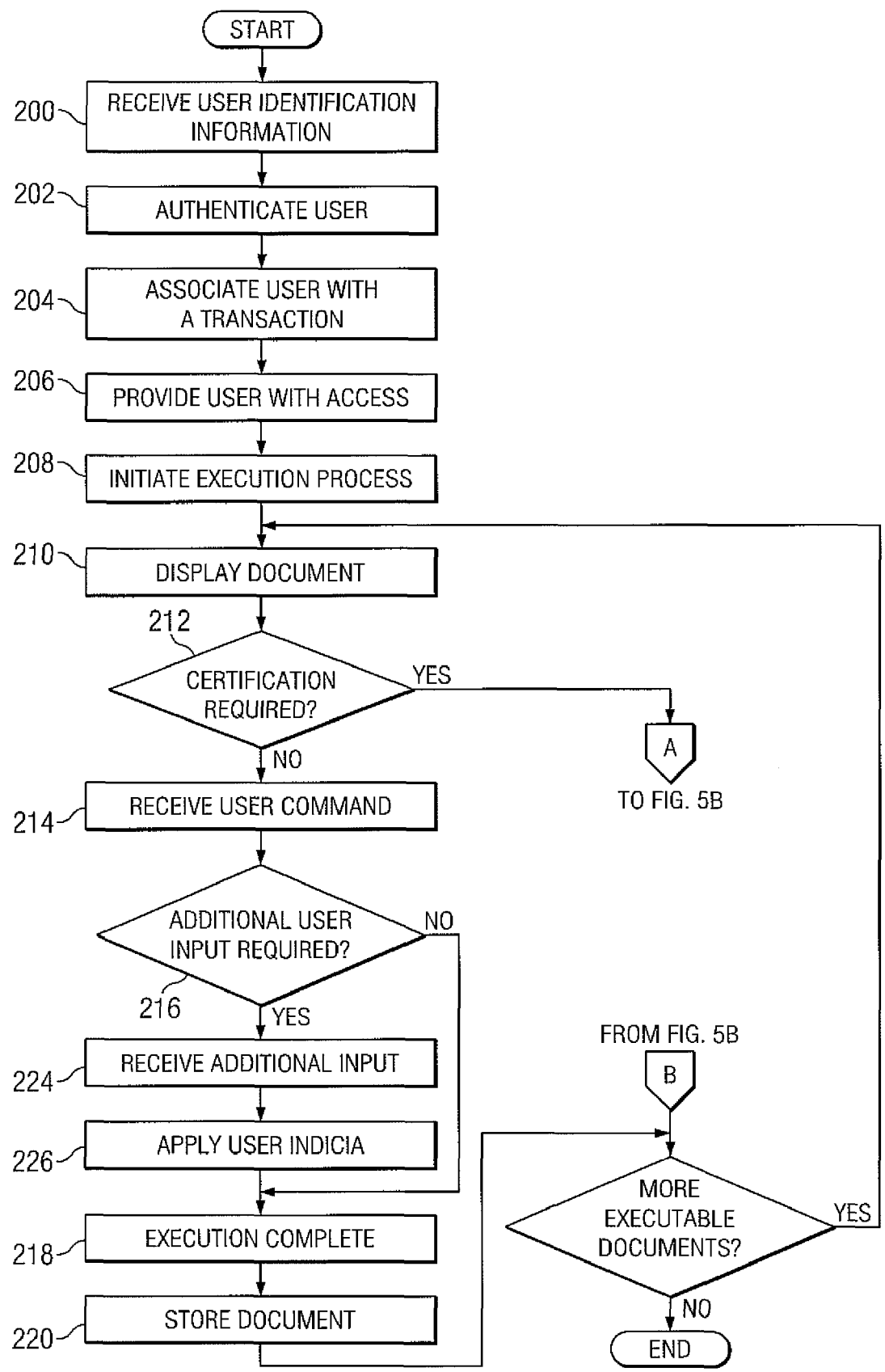

FIGS. 5A and 5B illustrate flow charts describing an example method for the electronic execution and certification of transaction documents in accordance with the present invention. The method begins at step 200 when user identification information is received. As described above, the identification information may include, in particular embodiments, a user name and password that is unique to a registered user of TMS 42. The identification information may be used by TMS 42 to authenticate or verify the identity of the user to TMS 42 at step 202.

At step 204, the user may be associated with a transaction. For example, where the user comprises buyer 52, TMS 42 may identify buyer 52 as a buyer with respect to a subject property in a real estate transaction. Based on the role of the user in the real estate transaction or based on the identity of the user generally, the user may be provided with access to one or more transaction documents at step 206. For example, buyer 52 may be provided access to a buyer/seller's contract, a mortgage document, and any other documents related to the transaction that are of immediate interest to buyer 52.

The user may select a document to which the buyer has access and initiate an execution process at step 208. The execution process may be carried out from any computer 56 with access to TMS 42. For example, the execution process may be initiated when buyer 52 is present at computer 56 at the buyer's house. Thus, the execution may be initiated as part of a virtual or remote closing event. As will be described in more detail below, the initiation of the execution process may also include a pre-execution user session in which the user is permitted to review transaction documents at the user's leisure and indicate the user's intention to have a later captured signature applied to the transaction document. As another example, the execution process may be initiated when the buyer is present at a computer 56 at closing location 60.

At step 210, a transaction document enabled for electronic execution is displayed to the user. The document may be displayed on any computer 56 with network access to documents maintained by TMS 42. The transaction document may be displayed as part of a grouping 84 of transaction documents that are all enabled for electronic execution by this particular user. In particular embodiments, the document displayed may include the first in the grouping 84 to be sequentially displayed for electronic execution by the user. For example, a buyer/seller's contract may be the first in a sequence of documents that are displayed to buyer 52 for the buyer's review and signature or approval.

A determination is made at step 212 as to whether electronic certification is required for the displayed transaction document. If electronic certification is not required, the method continues to step 214 where a user command is received. In particular embodiments, the type of user command and effect of the user command is dependent upon the type of execution process initiated at step 208. For example, if the execution process initiated at step 208 comprises a pre-execution session that enables a user to review a transaction document and indicate an intention to be bound to the document at some time in the future, the user command may be representative of such an intention. In such embodiments, the user command may include one or more "click-to-sign" commands that identify the user's consent to have particular signature blocks within the transaction document earmarked for the user's signature at some time later in the execution process. For example, buyer 52 may be presented with the mortgage document. While reviewing the mortgage document, buyer 52 may click on one or more signature boxes assigned to buyer 52 to indicate an intention to be bound to the transaction document in the future.

In another embodiment, the user command received at step 214 may include one or more user commands that identify the user's consent to be presently bound to the transaction document. Thus, the user command may indicate the user's intention to execute the document during the current user session. For example, where jurisdictional requirements permit "click-to-sign" commands to legally bind a user to a transaction document, the user command may include "click-to-sign" commands identifying particular signature blocks within the transaction document that the user has executed.

At step 216, a determination is made as to whether further user input is required to formally execute the transaction document. As described above, further user input may not be required where jurisdictional requirements permit "click-to-sign" or other electronically received commands to legally bind a user to a transaction document. In such a jurisdiction, the method may continue to step 218 and the execution of the transaction document may be deemed to be complete with respect to this user. Where further signatures by other parties are required, however, the execution of the document may only be deemed as complete with respect to this particular user. The at least partially executed document may then be stored by TMS 42 at step 220.

Returning to step 216, if it is determined that additional user input is required to complete the execution of the transaction document, the method may continue to step 224 where additional user input is received. In particular embodiments, the additional user input may include an electronic representation of the user's signature that is captured using signature capture device 62 or another input device. In other embodiments, the additional user input may include a digital certificate or other certification indicia that is associated with the user. Depending upon whether the closing process includes a remote closing event, a physical closing event, or some features of both, the additional user input received in step 224 may be received in the current user session or a future user session.

After the additional user input is received at step 224, the method may continue to step 218, which is described above as including the deeming of a transaction document to be complete with respect to execution by the present user. The at least partially executed document may then be stored by TMS 42 at step 220. The method may then proceed to step 228 where a determination is made as to whether the user has additional execution enabled documents to execute. Where no such documents are maintained by TMS 42, the method may terminate. Conversely, where TMS 42 maintains additional documents for the user to execute, the method may return to step 210, and the next document may be displayed to the user. The method may cycle through steps 210-228 until all documents that are enabled for execution by this user have been executed or until the user terminates the user session.

Returning to step 212, if it is determined that certification of the document is required, a modified execution process may be used. At step 230, notary identification information may be received. Similar to the user identification information described above, the notary identification information may include, in particular embodiments, a user name and/or password that is associated with a notary that is registered with TMS 42. The notary identification information may be used by TMS 42 to authenticate, or verify the identity of, the notary to TMS 42 at step 232. In particular embodiments, the authentication of the notary may result in the identification of a digital file in database 80 or another database to which TMS 42 has access. The digital file may contain information about the notary and may include an electronic capture of a seal or other indicia that may be affixed to a transaction document. In other embodiments, the digital file may identify a certification authority that may be contacted for the obtainment of an electronic seal or other indicia.

The authentication of the notary at step 232 may also result in the verification of the notary's physical location. Specifically, TMS 42 may verify that the notary has logged in using a computer 56 that is in the same physical location as the logged in signatory. For example, where buyer 52 is using computer 56 at the buyer's house to electronically execute a mortgage document, TMS 42 may authenticate the notary identification information to verify that the notary is also logged into TMS 42 and is using the same computer 56. As another example, where buyer 52 is using computer 56 at a closing location 60 to electronically execute a mortgage document, TMS 42 may authenticate the notary identification information to verify that the notary is also logged into TMS 42 using the same computer 56 or a physically proximate computer 56 at closing location 60.

At step 234, a user command is received. The user command received may include one or more user commands that identify the user's consent to be presently bound to the terms of the transaction document. Thus, the user command may indicate the user's intention to execute the document. In particular embodiments, the user command may include "click-to-sign" commands that are associated with one or more signature boxes within the transaction document. Where jurisdictional requirements permit "click-to-sign" commands to legally bind a signing party, the "click-to-sign" commands may be all that is required from user to execute the transaction document.

In other embodiments, the user command may additionally or alternatively include an electronic representation of the user's signature that is captured using signature capture device 62. Alternatively, the user command may include a digital certificate or other certification indicia that is associated with the executing user. After such commands are received from the user, the electronic representation of the user's signature, the digital certificate, or other certification indicia may be applied to the transaction document, at step 236, to legally bind the user to the terms of the transaction document.

At step 238, a notary command may be received. The notary command may indicate that the notary has performed his duties successfully with regard to the user-execution of the transaction document. For example, the notary command may attest to the fact that the notary was present and watched the execution of the transaction document by the signatory. The notary command may also identify the notary's intention to certify the document. As a result, indicia associated with the notary (which may include a digital certificate) may be imported or otherwise affixed to the transaction document at step 240. Once affixed to the document, the document may be considered a legally binding, certified and notarized transaction document. In particular embodiments, other security measures may also be performed to improve the reliability of the certified document. For example, the document may be tamper sealed to prevent any further changes to the transaction document. As another example, the document may be watermarked such that non-certified copies of the document can not be produced.

After the certification of the transaction document and the application of any security features to the document, the transaction document may be stored at step 220. The method may then continue to step 228 where a determination is made as to whether the user has additional documents to execute. Where no such documents are maintained by TMS 42, the method may terminate. Conversely, where TMS 42 maintains additional documents for the user to execute the method may return to step 210, and the next document may be displayed to the user. The method may cycle through steps 210-228 (and steps 230-240 where certification is required) until all documents that are enabled for execution by this user have been executed or until the user terminates the user session.

Modifications, additions, or omissions may be made to the method illustrated in FIGS. 5A and 5B without departing from the scope of the invention. The method may include more, fewer, or other steps. Additionally, the steps may be performed in any suitable order without departing from the scope of the invention. The illustrated and described method is merely one example of a method that may be used by TMS 42 to provide for the execution and certification of a transaction document.

The TMS 42 described above and the associated methods for creating, executing, and certifying electronically managed documents may exhibit many advantages over prior transaction management systems. For example, in particular embodiments, an integrated system is provided that performs both document management and electronic execution and/or certification functions. As a result, document preparers representing different roles in a transaction may create transaction documents and enable those documents for electronic execution. The documents associated with the transaction may then be stored in a centralized location for access by any parties who have an interest in the transaction and have permission to access the document. Furthermore, because the functions are integrated into a single system that is web-based, consumer interfacing with the system may be performed from any remote location. As a result, signatories may review documents prior to a remote or physical closing event to familiarize themselves with the transaction documents. The document executors may then use the same system to execute the documents at a later date. In a similar manner, signatories may identify documents or portions of documents to which the signing party wishes a future-captured signature to be applied. As a result, the closing process may be made more efficient.

As an additional feature, the functionality provided by the system may be role-based or user based such that individual users receive customized views and/or are given customized options based upon their identify or role to the transaction. Thus, the system may differentiate between the views provided to a notary and the views provided to a buyer of a real estate property. In particular embodiments, each party may only have access to documents for which they are responsible. Additionally or alternatively, each party may view all documents but only be able to effect changes to documents to which they are granted permission. The execution options provided to the parties may also vary depending upon the signing party's role with respect to the particular transaction. For example, a buyer may be provided with a "click-to-sign" feature while a notary is provided with a digital certificate retrieval feature. In this manner, the process may customized on a per-user, per-role, per-document, or per-transaction basis. Furthermore, the customized features and processes may be expanded or diminished as desired based on manager preferences.

Still another feature may include the system's ability to allow for concurrent signing by multiple parties from a common location or from different remote locations. Where parties desire or are required to be present at a common physical location, the web-based accessibility of documents maintained by the above-described systems allow each user to execute the document at the same time while in each other's presence. Conversely, where remote closing is desired, the parties may use network enabled computers to access the same document for concurrent execution. Because the respective parties are only able to effect changes to user-designated portions of the document, the resolution of the changes within the document are minimized.

As still another example, a "click-to-sign" feature may enable signatories to sign their signature only once and have that electronically captured signature applied as many times as required to a transaction document or a group of transaction documents. For example, a user may peruse through a transaction document at a closing event or even at the user's leisure at some time prior to the closing event. As the user is reviewing the document, the user may indicate his consent and intention to have a later-captured signature or other representative indicia associated with the user applied to one or more signature blocks within the document. For example, where initialing is required on each page of the document, the user may use a mouse or other input device to "click" on an initial block at the bottom of each page of the document when review of the page is complete. Similarly, the user may use a mouse or other input device to "click" on a signature block at the end of the document. A similar process may be used for other documents that are also related to the transaction. As a result of this pre-closing process, the closing event may be greatly simplified. For example, whether the closing event is performed virtually or at an identified physical location, a signature capture device may be used to capture an electronic representation of the user's signature and/or initials. The signature or initials may then be automatically applied to each signature block and initial block, respectively, that was identified by the buyer during the "click-to-sign" process.

An additional feature that may be provided may include electronic notarization or certification of executed documents. Specifically, authentication procedures may be used to verify the presence of the notary at the execution of the document. Upon authentication, the notary may "click-to-sign" any appropriate transaction documents and may use a signature capture device to apply the notary's signature to the documents. Alternatively, a digital certificate retrieval tool may be used to generate or acquire a digital certificate associated with the notary. The digital certificate may be applied to documents to result in the certification of such documents in accordance with jurisdictional requirements. An additional advantage may be that the notary may choose to batch notarize multiple transaction documents with one click. Furthermore, in particular embodiments, features similar to these may be used to allow for the electronic witnessing of transaction documents.

Although the present invention has been described in detail, it should be understood that various changes, substitutions and alterations can be made hereto without departing from the sphere and scope of the invention as defined by the appended claims. Additionally, it is not intended that all embodiments of the invention exhibit one, some, or all of the above-described advantages. Furthermore, it is not intended that the listed advantages include an exhaustive list of the advantages that may be exhibited by the systems and methods described above.

To aid the Patent Office, and any readers of any patent issued on this application in interpreting the claims appended hereto, applicants wish to note that they do not intend any of the appended claims to invoke ¶ 6 of 35 U.S.C. §112 as it exists on the date of filing hereof unless "means for" or "step for" are used in the particular claim.

What is claimed is:

1. A method for electronically executing an electronic document, comprising:
    receiving, from a first computer, first identification information associated with a first signatory user;
    receiving, from a second computer, second identification information associated with a second signatory user;
    identifying at least one unexecuted electronic document that requires execution by the first and second signatory users;
    receiving a first user command from the first computer identifying the assent of the first signatory user to the execution of the at least one unexecuted electronic document;
    receiving a second user command from the second computer identifying the assent of the second signatory user to the execution of the at least one unexecuted electronic document;
    receiving a third user command from the first computer identifying the presence of a notary user with the first signatory user;
    in response to receiving the first user command and the second user command, electronically executing the at least one unexecuted document by applying official electronic notarization indicia associated with the notary user to the at least one unexecuted document to create at least one electronically executed document, the official electronic notarization indicia certifying the presence of the notary user at the execution of the at least one executed and certified electronic document by the first user and identifying the notary user as a registered and valid notary meeting at least one jurisdictional requirement.

2. The method of claim 1, wherein electronically executing the at least one unexecuted document comprises:
    applying a first electronic signature associated with the first signatory user to the at least one unexecuted electronic document; and
    applying a second electronic signature associated with the second signatory user to the at least one unexecuted electronic document.

3. The method of claim 1, wherein electronically executing the at least one unexecuted document comprises:
    applying a first digital certificate associated with the first signatory user to the at least one unexecuted electronic document; and applying a second digital certificate associated with the second signatory user to the at least one unexecuted electronic document.

4. The method of claim 1, wherein:
receiving the first user command comprises identifying that the first user used an input device associated with the first computer to click on a first signature box within the at least one unexecuted electronic document; and
receiving the second user command comprises identifying that the second user used an input device associated with the second computer to click on a second signature box within the at least one unexecuted electronic document.

5. The method of claim 1, further comprising:
electronically capturing a representation of a signature of the first user; and
electronically capturing a representation of a signature of the second user, and
wherein electronically executing the at least one unexecuted document comprises applying the electronically captured representations of the signatures of the first and second users to the at least one unexecuted document to create the electronically executed document.

6. The method of claim 1, wherein the first and second computers are located at a common location.

7. The method of claim 1, wherein the first and second users perform execution duties concurrently such that the first and second user commands are received substantially concurrently.

8. The method of claim 1, wherein the first and second users perform execution duties independently of each other at different times such that the first and second user commands are received at different times.

9. The method of claim 1, further, wherein the third user command identifies the assent of a notary user to the certification of the at least one unexecuted electronic document.

10. The method of claim 1, wherein the third user command identifying the assent of a notary user to the certification of the at least one unexecuted electronic document.

11. A method for electronically executing an electronic document, comprising:
receiving, from a single computer, first identification information associated with a first signatory user;
receiving, from the single computer, second identification information associated with a second signatory user;
receiving, from the single computer, third identification information associated with a notary user;
identifying, on a display, at least one unexecuted electronic document that requires execution by the first and second signatory users;
receiving a first user command from the single computer identifying the assent of the first signatory user to the execution of the at least one unexecuted electronic document;
receiving a second user command from the single computer identifying the assent of the second signatory user to the execution of the at least one unexecuted electronic document;
receiving a third user command from the single computer identifying the presence of a notary user with the first signatory user;
in response to receiving the first user command and the second user command, electronically executing the at least one unexecuted document by applying official electronic notarization indicia associated with the notary user to the at least one unexecuted document to create at least one electronically executed document, the official electronic notarization indicia certifying the presence of the notary user at the execution of the at least one executed and certified electronic document by the first user and identifying the notary user as a registered and valid notary meeting at least one jurisdictional requirement.

12. The method of claim 11, wherein electronically executing the at least one unexecuted document comprises:
applying a first electronic signature associated with the first signatory user to the at least one unexecuted electronic document; and
applying a second electronic signature associated with the second signatory user to the at least one unexecuted electronic document.

13. The method of claim 11, wherein electronically executing the at least one unexecuted document comprises:
applying a first digital certificate associated with the first signatory user to the at least one unexecuted electronic document; and
applying a second digital certificate associated with the second signatory user to the at least one unexecuted electronic document.

14. The method of claim 11, wherein:
receiving the first user command comprises identifying that the first user used an input device associated with the first computer to click on a first signature box within the at least one unexecuted electronic document; and
receiving the second user command comprises identifying that the second user used the input device associated with the first computer to click on a second signature box within the at least one unexecuted electronic document.

15. The method of claim 11, further comprising:
electronically capturing a representation of a signature of the first user; and
electronically capturing a representation of a signature of the second user, and
wherein electronically executing the at least one unexecuted document comprises applying the electronically captured representations of the signatures of the first and second users to the at least one unexecuted document to create the electronically executed document.

16. A method for electronically executing an electronic document, comprising:
receiving, from a computer, identification information associated with a signatory user;
identifying, on a display, a first unexecuted electronic document that requires execution by the first signatory user;
identifying, on the display, a first signature location within the first unexecuted electronic document;
receiving, from the computer, a first user command identifying the assent of the signatory user to have a later captured signature applied to the first unexecuted electronic document at the first signature location;
identifying, on the display, at least one additional signature location within the first unexecuted electronic document;
for each at least one additional signature location, receiving, from the computer, at least one additional user command identifying the assent of the signatory user to have the later captured signature applied to the first unexecuted electronic document at the first signature location;
at some time after the first user command and the at least one additional user commands are received from the computer, using an electronic signature pad to electronically capture a representation of a handwritten signature of the signatory user;

in response to capturing the signature of the signatory user, creating a first executed document by applying the electronic signature of the signatory user to the first signature location and to each at least one additional signature location within the first unexecuted electronic document;

receiving a second user command from the first computer identifying the presence of a notary user with the signatory user; and in response to receiving the second user command, electronically executing the at least one unexecuted document by applying official electronic notarization indicia associated with the notary user to the at least one unexecuted document to create at least one electronically executed document, the official electronic notarization indicia certifying the presence of the notary user at the execution of the at least one executed and certified electronic document by the user and identifying the notary user as a registered and valid notary meeting at least one jurisdictional requirement.

17. The method of claim 16, wherein receiving the first user command comprises identifying that the first user used an input device associated with the computer to click on the first signature location within the at least one unexecuted electronic document.

18. The method of claim 16, further comprising:
receiving a notary user command from a notary user, the user command identifying the assent of the notary user to the certification of the first unexecuted electronic document; and in response to receiving the third user command, applying official notarization indicia associated with the notary user to the first unexecuted electronic document, the official notarization indicia certifying the presence of the notary user at the execution of the first unexecuted electronic document by the signatory user and identifying the notary user as a registered and valid notary meeting at least one jurisdictional requirement.

19. The method of claim 16, further comprising:
at some time prior to electronically capturing the electronic signature of the signatory user, identifying, on a display, a second unexecuted electronic document that requires execution by the first signatory user;

at some time prior to electronically capturing the electronic signature of the signatory user, identifying, on the display, a signature location within the second unexecuted electronic document; and at some time prior to electronically capturing the electronic signature of the signatory user, receiving, from the computer, a user command identifying the assent of the signatory user to have a later captured signature applied to the second unexecuted electronic document at the signature location, and at some time after electronically capturing the electronic signature of the signatory user, creating a second executed document by applying the electronic signature of the signatory user to the signature location within the second unexecuted electronic document.

20. A non-transitory computer-readable medium embodying a program of instructions for generating a certified electronic document when executed by a computer, the program of instructions operable to cause the computer to perform steps comprising:
receiving, from a first computer, first identification information associated with a first signatory user;
receiving, from a second computer, second identification information associated with a second signatory user;

identifying at least one unexecuted electronic document that requires execution by the first and second signatory users;

receiving a first user command from the first computer identifying the assent of the first signatory user to the execution of the at least one unexecuted electronic document;

receiving a second user command from the second computer identifying the assent of the second signatory user to the execution of the at least one unexecuted electronic document;

receiving a third user command from the first computer identifying the presence of a notary user with the first signatory user; and in response to receiving the first user command and the second user command, electronically executing the at least one unexecuted document by applying official electronic notarization indicia associated with the notary user to the at least one unexecuted document to create at least one electronically executed document, the official electronic notarization indicia certifying the presence of the notary user at the execution of the at least one executed and certified electronic document by the first user and identifying the notary user as a registered and valid notary meeting at least one jurisdictional requirement.

21. The non-transitory computer-readable medium of claim 20, wherein the program of instructions is further operable to cause the computer to:
apply a first electronic signature associated with the first signatory user to the at least one unexecuted electronic document; and
apply a second electronic signature associated with the second signatory user to the at least one unexecuted electronic document.

22. The non-transitory computer-readable medium of claim 20, wherein the program of instructions is further operable to cause the computer to:
apply a first digital certificate associated with the first signatory user to the at least one unexecuted electronic document; and
apply a second digital certificate associated with the second signatory user to the at least one unexecuted electronic document.

23. The non-transitory computer-readable medium of claim 20, wherein the program of instructions is further operable to cause the computer to:
receive the first user command comprises identifying that the first user used an input device associated with the first computer to click on a first signature box within the at least one unexecuted electronic document; and
receive the second user command comprises identifying that the second user used an input device associated with the second computer to click on a second signature box within the at least one unexecuted electronic document.

24. The non-transitory computer-readable medium of claim 20, wherein the program of instructions is further operable to cause the computer to:
electronically capture a representation of a signature of the first user; and
electronically capture a representation of a signature of the second user, and
wherein electronically executing the at least one unexecuted document comprises applying the electronically captured representations of the signatures of the first and second users to the at least one unexecuted document to create the electronically executed document.

25. The non-transitory computer-readable medium of claim 20, wherein the first and second computers are located at a common location.

26. The non-transitory computer-readable medium of claim 20, wherein the first and second users perform execution duties concurrently such that the first and second user commands are received substantially concurrently.

27. The non-transitory computer-readable medium of claim 20, wherein the first and second users perform execution duties independently of each other at different times such that the first and second user commands are received at different times.

28. The non-transitory computer-readable medium of claim 20, wherein the third user command identifying the assent of a notary user to the certification of the at least one unexecuted electronic document.

29. A non-transitory computer-readable medium embodying a program of instructions for generating a certified electronic document when executed by a computer, the program of instructions operable to cause the computer to perform steps comprising:
   receiving, from a single computer, first identification information associated with a first signatory user;
   receiving, from the single computer, second identification information associated with a second signatory user;
   receiving from the single computer, third identification information associated with a notary user;
   identifying, on a display, at least one unexecuted electronic document that requires execution by the first and second signatory users;
   receiving a first user command from the single computer identifying the assent of the first signatory user to the execution of the at least one unexecuted electronic document;
   receiving a second user command from the single computer identifying the assent of the second signatory user to the execution of the at least one unexecuted electronic document;
   receiving a third user command from the single computer identifying the presence of a notary user with the first signatory user; and
   in response to receiving the first user command and the second user command, electronically executing the at least one unexecuted document by applying official electronic notarization indicia associated with the notary user to the at least one unexecuted document to create at least one electronically executed document, the official electronic notarization indicia certifying the presence of the notary user at the execution of the at least one executed and certified electronic document by the first user and identifying the notary user as a registered and valid notary meeting at least one jurisdictional requirement.

30. The non-transitory computer-readable medium of claim 29, wherein the program of instructions is further operable to cause the computer to:
   apply a first electronic signature associated with the first signatory user to the at least one unexecuted electronic document; and
   apply a second electronic signature associated with the second signatory user to the at least one unexecuted electronic document.

31. The non-transitory computer-readable medium of claim 29, wherein the program of instructions is further operable to cause the computer to:
   apply a first digital certificate associated with the first signatory user to the at least one unexecuted electronic document; and
   apply a second digital certificate associated with the second signatory user to the at least one unexecuted electronic document.

32. The non-transitory computer-readable medium of claim 29, wherein:
   receiving the first user command comprises identifying that the first user used an input device associated with the first computer to click on a first signature box within the at least one unexecuted electronic document; and
   receiving the second user command comprises identifying that the second user used the input device associated with the first computer to click on a second signature box within the at least one unexecuted electronic document.

33. The non-transitory computer-readable medium of claim 29, wherein the program of instructions is further operable to cause the computer to:
   electronically capture a representation of a signature of the first user; and
   electronically capture a representation of a signature of the second user, and
   wherein electronically executing the at least one unexecuted document comprises applying the electronically captured representations of the signatures of the first and second users to the at least one unexecuted document to create the electronically executed document.

34. The non-transitory computer-readable medium of claim 29, wherein the third user command identifying the assent of a notary user to the certification of the at least one unexecuted electronic document.

35. A non-transitory computer-readable medium embodying a program of instructions for generating a certified electronic document when executed by a computer, the program of instructions operable to cause the computer to perform steps comprising:
   receiving identification information associated with a signatory user;
   identifying, on a display, a first unexecuted electronic document that requires execution by the first signatory user;
   identifying, on the display, a first signature location within the first unexecuted electronic document;
   receiving a first user command identifying the assent of the signatory user to have a later captured signature applied to the first unexecuted electronic document at the first signature location;
   identifying, on the display, at least one additional signature location within the first unexecuted electronic document;
   for each at least one additional signature location, receiving at least one additional user command identifying the assent of the signatory user to have the later captured signature applied to the first unexecuted electronic document at the first signature location;
   at some time after the first user command and the at least one additional user commands are received from the computer, electronically capturing the electronic signature of the signatory user;
   in response to capturing the signature of the signatory user, creating a first executed document by applying the electronic signature of the signatory user to the first signature location and to each at least one additional signature location within the first unexecuted electronic document;

receiving a second user command from the first computer identifying the presence of a notary user with the signatory user; and in response to receiving the second user command, electronically executing the at least one unexecuted document by applying official electronic notarization indicia associated with the notary user to the at least one unexecuted document to create at least one electronically executed document, the official electronic notarization indicia certifying the presence of the notary user at the execution of the at least one executed and certified electronic document by the user and identifying the notary user as a registered and valid notary meeting at least one jurisdictional requirement.

36. The non-transitory computer-readable medium of claim 35, wherein receiving the first user command comprises identifying that the first user used an input device to click on the first signature location within the at least one unexecuted electronic document.

37. The non-transitory computer-readable medium of claim 35, wherein the program of instructions is further operable to cause the computer to:

receive a notary user command from a notary user, the user command identifying the assent of the notary user to the certification of the first unexecuted electronic document; and in response to receiving the third user command, apply official notarization indicia associated with the notary user to the first unexecuted electronic document, the official notarization indicia certifying the presence of the notary user at the execution of the first unexecuted electronic document by the signatory user and identifying the notary user as a registered and valid notary meeting at least one jurisdictional requirement.

38. The non-transitory computer-readable medium of claim 35, wherein the program of instructions is further operable to cause the computer to:

at some time prior to electronically capturing the electronic signature of the signatory user, identify, on a display, a second unexecuted electronic document that requires execution by the first signatory user;

at some time prior to electronically capturing the electronic signature of the signatory user, identify, on the display, a signature location within the second unexecuted electronic document; and at some time prior to electronically capturing the electronic signature of the signatory user, receive a user command identifying the assent of the signatory user to have a later captured signature applied to the second unexecuted electronic document at the signature location, and at some time after electronically capturing the electronic signature of the signatory user, create a second executed document by applying the electronic signature of the signatory user to the signature location within the second unexecuted electronic document.

* * * * *